(12) United States Patent
Ogasawara

(10) Patent No.: US 8,793,672 B2
(45) Date of Patent: Jul. 29, 2014

(54) OPTIMIZING PROGRAM BY REUSING EXECUTION RESULT OF SUBCLASS TEST FUNCTION

(75) Inventor: Takeshi Ogasawara, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 13/413,709

(22) Filed: Mar. 7, 2012

(65) Prior Publication Data
US 2012/0233597 A1 Sep. 13, 2012

(30) Foreign Application Priority Data
Mar. 9, 2011 (JP) ................................. 2011-050998

(51) Int. Cl.
*G06F 9/45* (2006.01)
(52) U.S. Cl.
USPC .......................................... 717/151; 717/153
(58) Field of Classification Search
None
See application file for complete search history.

(56) References Cited

U.S. PATENT DOCUMENTS

| | | | |
|---|---|---|---|
| 6,714,991 B1 * | 3/2004 | Bak et al. ....................... | 719/316 |
| 7,007,030 B2 | 2/2006 | Zibin et al. | |
| 7,080,354 B2 | 7/2006 | Adl-Tabatabai et al. | |
| 7,216,333 B2 | 5/2007 | Neuenhofen | |
| 7,266,813 B2 | 9/2007 | Nistler et al. | |
| 2003/0079201 A1 * | 4/2003 | Sokolov ........................ | 717/118 |
| 2007/0168949 A1 * | 7/2007 | Shattuck et al. .............. | 717/115 |
| 2010/0077286 A1 * | 3/2010 | Guagenti et al. .............. | 715/205 |
| 2010/0088679 A1 * | 4/2010 | Langworthy et al. ......... | 717/126 |

FOREIGN PATENT DOCUMENTS

| | | | |
|---|---|---|---|
| JP | 2000039997 A | 2/2000 | |
| JP | 2003186675 A | 7/2003 | |

* cited by examiner

*Primary Examiner* — Li B Zhen
*Assistant Examiner* — Sen Chen
(74) *Attorney, Agent, or Firm* — Scully, Scott, Murphy & Presser, P.C.; Jennifer Davis, Esq.

(57) ABSTRACT

A technique for optimizing a program by reusing an execution result of a subclass test function. It includes a reusability determining unit to determine reusability of code of a subclass test function based on whether access to a global memory includes only access for reading out type information specified in a function call, a profiling unit configured to store an execution result of code determined to be reusable and specified information in a storage device in association with actually accessed type information, a reuse processing unit configured to reuse, in response to detection of a function call for calling the code determined to be reusable, the execution result on condition that the pieces of specified information specified in the function calls match, and a monitoring unit configured to monitor the type information associated with the execution result and prohibit reuse of the execution result if the type information is changed.

13 Claims, 14 Drawing Sheets

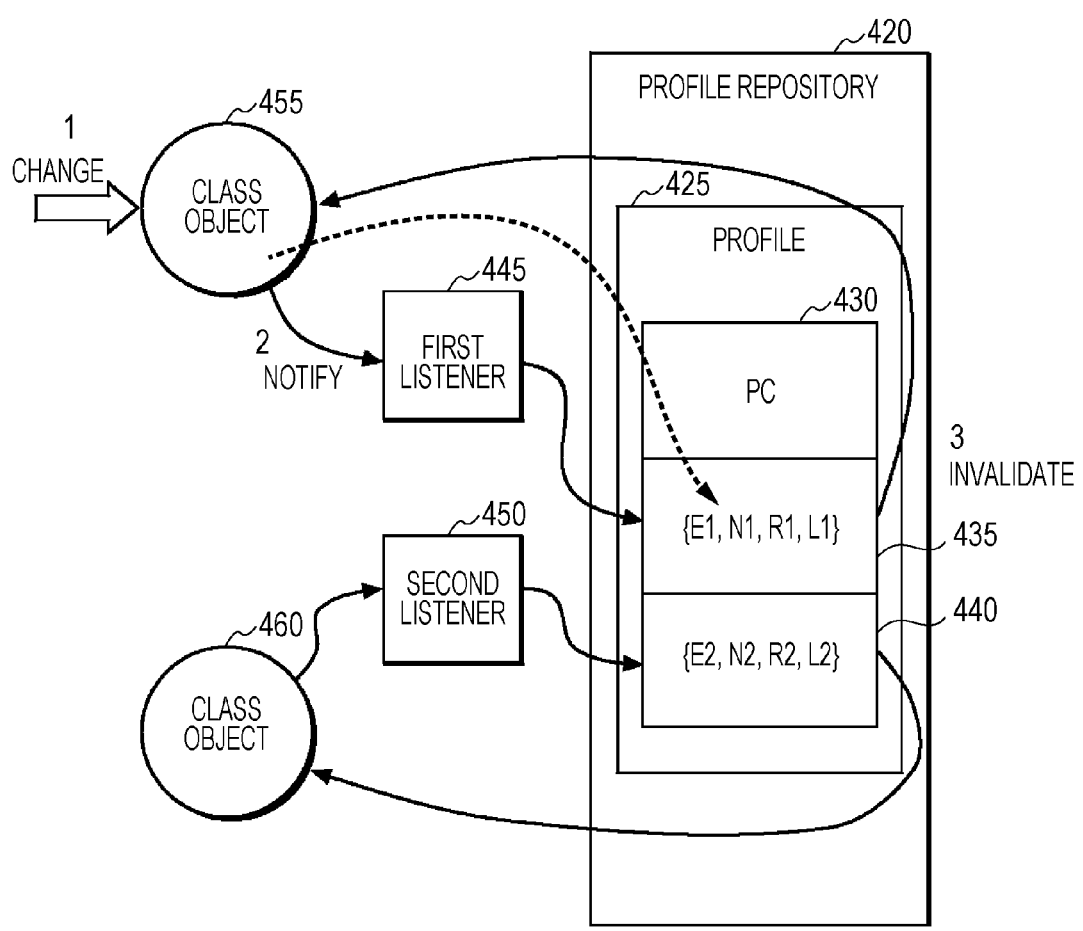

OPTIMIZING PROGRAM BY REUSING EXECUTION RESULT OF SUBCLASS TEST FUNCTION

CROSS REFERENCE TO RELATED APPLICATION

This application claims priority under 35 U.S.C. 119 from Japanese Application 2011-050998, filed Mar. 9, 2011, the entire contents of which are incorporated herein by reference.

BACKGROUND OF THE INVENTION

1. Field of the Invention

The present invention relates to techniques for reusing execution results of subclass test functions in execution environments of dynamic programming languages. More particularly, the present invention relates to a technique for optimizing a program by efficiently and securely reusing profiled execution results of subclass test functions.

2. Description of Related Art

In object-oriented languages, subclass test functions for testing whether an object is an instance of a class or an instance of a subclass of a class are often used. As such subclass test functions, the "instanceof" operator in Java® programming language and the "isinstance" function in Python, for example, are known. These subclass test functions are used when different processes are performed for individual classes in normal operations and exception handling.

The frequency in use of subclass test functions is high but the subclass test functions have a high check cost, which is a problem. Accordingly, regarding subclass test functions whose operations are uniquely decided by the language specifications, such as the "instanceof" operator in Java®, optimization approaches for simply caching results of tests conducted in the past and using the cached test results have been hitherto adopted (see, for example, Japanese Unexamined Patent Application Publication No. 2000-39997 and U.S. Pat. No. 7,266,813).

In addition, several patent literatures disclose other techniques for checking types of objects. U.S. Pat. No. 7,080,354 discloses the following technique: A virtual dynamic type check (DTC) function is generated for each object at run time. The virtual DTC function contains a sequence of instructions to type-check every element within an object type hierarchy. The virtual DTC function conducts dynamic type checking more efficiently for objects of a particular type for which the virtual DTC function is tailored.

U.S. Pat. No. 7,007,030 discloses, as a method for representing a dataset having a plurality of elements characterized by a plurality of relations, a technique for assigning an identifier and an interval to each of the plurality of elements. The interval represents at least one relation of the element to at least one element of the plurality of elements.

Japanese Unexamined Patent Application Publication No. 2003-186675 discloses a technique for implementing, as an array of class references, a Java® class hierarchy which represents the hierarchical relationship of parent classes of a Java® class. The array of class references is used to efficiently perform type checking in Java® computing environments.

U.S. Pat. No. 7,216,333 discloses a technique for tracking superclasses of a class by using a subclass fingerprint and tracking locally declared interfaces of the class by using an interface fingerprint.

BRIEF SUMMARY OF THE INVENTION

To overcome these deficiencies, the present invention provides a method for optimizing a program, including: determining reusability of code called by a function call of a subclass test function included in an execution-target program, on the basis of whether or not access to a global memory within the code includes only access for reading out type information specified in the function call and information traceable from the type information; storing an execution result of code determined to be reusable and specified information specified in the function call of the code in a storage device as profile information of the code, in association with type information actually accessed within the code; reading out, in response to detection of the function call of the subclass test function that calls the code determined to be reusable, the profile information of the code from the storage device, and reusing the execution result of the profile information provided that the specified information of the profile information matches specified information specified in the detected function call; and monitoring the type information associated with the execution result included in the profile information stored in the storage device, and prohibiting, in response to a change made to the type information, reuse of the execution result associated with the type information.

According to another aspect, the present invention provides an optimization apparatus for optimizing a program by reusing an execution result of a subclass test function included in an execution-target program, the optimization apparatus including: a storage device; a reusability determining unit configured to determine reusability of code called by a function call of the subclass test function included in the execution-target program on the basis of whether or not access to a global memory within the code includes only access for reading out type information specified in the function call and information traceable from the type information; a profiling unit configured to store an execution result of code determined to be reusable and specified information specified in the function call of the code in a storage device as profile information of the code, in association with type information actually accessed within the code; a reuse processing unit configured to read out, in response to detection of a function call of a subclass test function that calls the code determined to be reusable, the profile information of the code from the storage device, and configured to reuse the execution result of the profile information provided that the specified information of the profile information matches specified information specified in the detected function call; and a monitoring unit configured to monitor the type information associated with the execution result included in the profile information stored in the storage device, and configured to prohibit, in response to a change made to the type information, reuse of the execution result associated with the type information.

BRIEF DESCRIPTION OF THE SEVERAL VIEWS OF THE DRAWINGS

FIG. 4B is a diagram schematically illustrating a flow of a process of invalidating profile information performed by the listener.

DETAILED DESCRIPTION OF THE PREFERRED EMBODIMENTS

Figure 1:
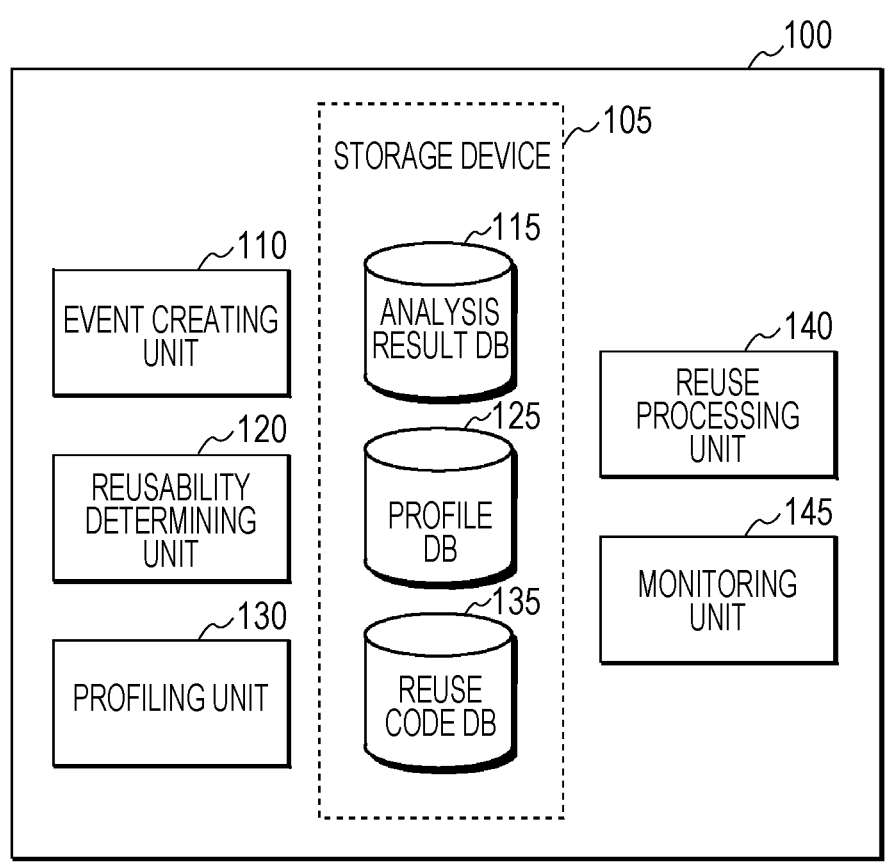
FIG. 1 is a diagram illustrating a functional configuration of an optimization apparatus 100 according to an embodiment of the present invention.

Embodiments of the present invention will be described in detail below based on the drawings. The following embodiments are not intended to limit the invention defined by the claims, and not all of the combinations of features described in the embodiments are mandatory for the problem-solving means of the invention. The same elements are assigned the same reference numerals throughout the description of the embodiments.

A technique for reusing test results of a subclass test function according to this invention is applied to dynamic programming languages, such as Python, in which bytecode for the subclass test function is absent and an entity of a called function and a definition of a subclass of each class may dynamically change. Prior to the detailed description of the present invention, a description will be given for a mechanism how a subclass test function whose operation is not uniquely decided is executed by using, as an example, the "isinstance" function that is a subclass test function in Python.

In Python, bytecode for a subclass test function is absent and operation of the subclass test function is defined by Python functions. Accordingly, a subclass test function is executed by a function call in Python. The following code is an example of a sequence of bytecode instructions for calling "isinstance (obj, clazz)".
LOAD_GLOBAL "isinstance"
LOAD_FAST "obj"
LOAD_FAST "clazz"
CALL_FUNCTION The behavior of the "isinstance" function is decided by the following two factors:
(1) A function to be called by a function call using a value of "isinstance".
(2) A definition of a class hierarchy in "clazz".

For each "isinstance" function included in Python source code, a program may change the factor globally or locally, and statically or dynamically. The default behavior of the "isinstance" function is provided by an interpreter system, such as CPython. The "isinstance" function is provided by a built-in C function, whereas the definition of the class hierarchy is provided by a C function.

If a user newly defines an "isinstance" function in Python source code, the "isinstance" function may execute different algorithms every time it is executed. That is, the behavior of the "isinstance" function may be freely defined or changed at the application level. The "isinstance" function calls a non-default function mainly in the following cases:

Case 1: In the case that the "isinstance" function is replaced in a built-in dictionary of a system.

Case 2: In the case that another "isinstance" function is defined in the current scope.

Case 3: In the case that a class has a unique "isinstance" function.

Regarding case 1, a built-in function may be replaced anytime at any position of the code at run time. A change caused by the replacement can be transparently seen from every code within the program. The following code represents an example of case 1. Numerals at the left end indicate line numbers. At line 5, replacement is instructed. As a result, a result of executing the "isinstance" function at line 6 is a result of executing the replacing "isinstance" function as shown at lines 7 and 8.

```
1 >>> import __builtin__
2 >>> def f(self, cls):
3 ... print "I am f"
4 ... return False
5 >>> __builtin__.isinstance = f
6 >>> isinstance("a", basestring)
7 I am f
8 False
```

Regarding case 2, an "isinstance" function unique to a module can be defined. The definition can be made statically in an "a.py" file and can be added, replaced, or deleted anytime at any position of the code at run time. Such a change can be transparently seen from every code within the program. The following code represents an example of case 2. Here, numerals at the left end also represent line numbers. Lines 1 to 6 show a definition made in the "a.py" file, whereas lines 7 to 16 show an execution result obtained when the "a.py" file is imported. At lines 10 and 11, the "isinstance" function defined in the "a.py" file is called. However, at line 14, the "isinstance" function is restored back to the default one. As a result, at line 15, the default "isinstance" function is called.

```
- a.py
1 def isinstance(self, cls):
2 print "a isinstance"
3 return False
4 class myclass(object):
5 def test(self, inst):
6 return isinstace(inst, myclass)
- run
7 >>> import a
8 >>>a.__dict__.keys( )
9 ['__builtins__', '__file__', 'myclass','__name__', 'isinstance', '__doc__']
10 >>>o=a.myclass( )
11 >>> o.test(o)
12 a isinstance
13 False
14 >>>a.isinstance=isinstance
15 >>> o.test(o)
16 True
```

Regarding case 3, a user sets a special metaclass when defining a class, thereby being able to change the default algorithm of the "isinstance" function. More specifically, the user defines a metaclass "_instancecheck_", thereby being able to replace the algorithm anytime at any position of the code at run time. Such a change can be transparently seen from the class and subclasses of the class. The following code represents an example of case 3. Here, numerals at the left end also represent line numbers. Additionally, lines 1 to 12 show a definition made in a "b.py" file, whereas lines 13 to 28 show a result obtained by executing the "b.py" file. In this example, the default "isinstance" function is called. However, it should be noted that the actual operation of the "isinstance" function is the operation defined by the user. The default "isinstance" function returns FALSE for "isinstance (T1, T2)" if T1 is not a subclass of T2. However, in the execution result of the "b.py" file, the default "isinstance" function returns TRUE because of "_instancecheck_" defined by the user.

```
- b.py
1 from abc import ABCMeta
2 class MyABC:
3 _metaclass_ = ABCMeta
4 @classmethod
5 def _instancecheck_(self, inst):
6 print"MyABC _instancecheck_"
7 returnTrue
8 class MyClass(MyABC):
9 pass
10 class HisClass(object):
11 pass
12 print isinstance(HisClass( ),MyClass)
- Run python b.py
13 >>> import b
14 MyABC _instancecheck_
15 True
16 >>> class MyXYZ(b.MyClass):
17 ... def f(self,inst):
18 ... print "MyXYZ f"
19 ... return True
20 >>> o=MyXYZ( )
21 >>> b.MyABC._instancecheck_
22 <bound methodABCMeta._instancecheck_ of <class 'b.MyABC'>>
23 >>>b.MyABC._instancecheck_=o.f
24 >>> b.MyABC._instancecheck_
25 <bound method hoe.f of<_main_.hoe object at 0x200b0730>>
26 >>> isinstance(b.HisClass( ),b.MyClass)
27 MyXYZ f
28 True
```

The present invention provides an optimization method for optimizing a program by reusing an execution result of a subclass test function. The optimization method can be applied to dynamic programming languages, for example Python, in which bytecode for the subclass test function is absent and an entity of a called function and a definition of a subclass of each class may dynamically change. The optimization method includes a step of determining reusability of code of the subclass test function, a step of profiling an execution result of the code of the subclass test function determined to be reusable, a step of detecting a function call for calling the code determined to be reusable and of reusing the execution result for the function call on a certain condition, and a step of monitoring occurrence of a state in which reuse of the execution result is inappropriate and of prohibiting the reuse.

There may be a plurality of concrete implementation methods for the optimization method including the foregoing four steps, such as: a first implementation method in which an interpreter performs profiling during run time of a program and just-in-time (JIT) code compiled by a JIT compiler uses the profiled result; a second implementation method in which an interpreter caches and uses a profiled result during run time of a program; and a third implementation method in which JIT code having a low optimization level profiles a test result and JIT code having a high optimization level uses the profiled result. Embodiments of the present invention will be described below in accordance with the first implementation method.

FIG. 1 is a functional block diagram of an optimization apparatus 100 according to an embodiment of the present invention. The optimization apparatus 100 includes an execution environment (not illustrated) for executing an execution-target program, which is bytecode that is generated from a source program written in a dynamic programming language and executed by a virtual machine. In the execution environment, the optimization apparatus 100 includes a storage device 105, an event creating unit 110, a reusability determining unit 120, a profiling unit 130, a reuse processing unit 140, and a monitoring unit 145. Meanwhile, the description will be given below based on an assumption that the execution-target program is bytecode generated by a Python interpreter from a source program written in Python.

The storage device 105 includes an analysis result database (DB) 115, a profile DB 125, and a reuse code DB 135. The analysis result DB 115 stores results of analysis made on code of a subclass test function by the reusability determining unit 120. The profile DB 125 stores results of profiling made on the subclass test function by the profiling unit 130. The reuse code DB 135 stores compiled code, which uses the execution result of the subclass test function and is generated by the reuse processing unit 140. Details about information stored in each DB will be described later in association with the corresponding component described below.

In response to the fact that bytecode to be executed next in the execution-target program is a function call of a subclass test function, the event creating unit 110 creates event information, which includes a function pointer pointing to code called by the function call and specified information specified in the function call. Here, the specified information specified in the function call of the subclass test function indicates input parameters in the function call, e.g., information that specifies an object and a type (class) that are subjected to the test. Meanwhile, the event information created by the event creating unit 110 may further include counter information. The event creating unit 110 increments the counter of the corresponding event information by one when the same subclass test function as the subclass test function for which the event information has been already created is called using the same input parameters.

Figure 2:
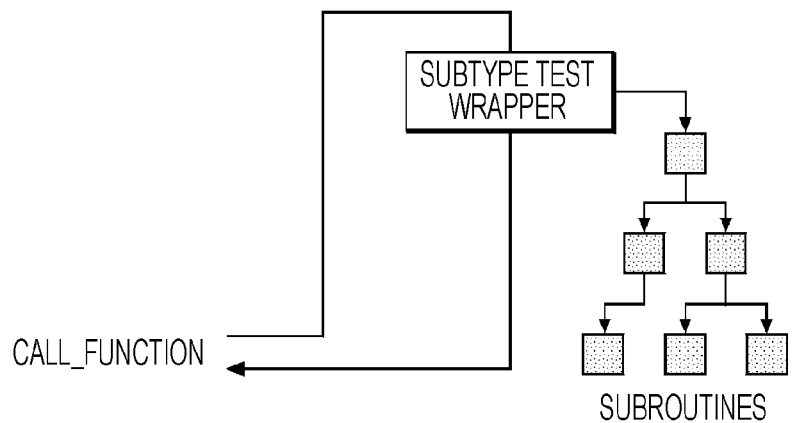
FIG. 2 is a diagram schematically illustrating a relation between bytecode CALL_FUNCTION and a subclass test function to be called.

FIG. 2 illustrates an example of a relation between a function call in Python bytecode and code to be called by the function call. As described above, the subclass test function "isinstance(obj, clazz)" in Python source code is converted into the following sequence of bytecode instructions including the function call (CALL_FUNCTION) by a Python interpreter:
LOAD_GLOBAL "isinstance"
LOAD_FAST "obj"
LOAD_FAST "clazz"
CALL_FUNCTION As illustrated in FIG. 2, the function call actually calls code (shown as subroutines in FIG. 2) serving as an entity of the subclass test function via a subtype test wrapper.

The reusability determining unit 120 determines reusability of the code called by the function call of the subclass test function included in the execution-target program. This is done on the basis of whether or not access to a global memory within the code includes only access for reading out type information specified in the function call of the subclass test function and information traceable from the type information. Here, the information traceable from the type information specified in the function call of the subclass test function is information pointed to by a pointer of a class object serving as the type information and is, for example, an object of a parent class. Additionally, the global memory indicates a memory area, a change made in which can be referred to even after the program exits from an execution unit such as a function that has made the change, and includes, for example, an object heap and global variables. Meanwhile, the reusability determining unit 120 may perform the aforementioned process in response to the process performed by the event creating unit 110 on condition that the counter of the event information is equal to or greater than a preset value.

As described above, since the type information is unlikely to change at run time, the reuse of execution results that are highly likely to be invalidated in the future can be eliminated by determining that execution results of the subclass test function are reusable on the condition that only access for reading out type information is performed as access to global information. Additionally, according to the foregoing condition, subclass test functions that perform write access to the global memory are excluded from reuse targets. In the case where a value written in the global memory within a subclass test function is referred to by another thread, the other thread may possibly read out an incorrect value if the subclass test function is no longer executed as a result of reusing the execution result. Accordingly, it is possible to avoid a situation where the entire program improperly operates, by excluding subclass test functions that may possibly cause such side effects from the reuse targets.

The aforementioned determination performed by the reusability determining unit 120 can be, for example, statically performed in the following manner: Specifically, the reusability determining unit 120 may retrieve all access instructions to the global memory from code for which reusability is determined. The reusability determining unit 120 may determine that the code is reusable on condition that all of the retrieved access instructions are regarding access for reading out the type information specified in the function call of the subclass test function and the information traceable from the type information.

Instead of the aforementioned static determination method, the reusability determining unit 120 may generate determination code in which values of the object and type information specified in the function call of the subclass test function are propagated on the code for which the reusability is determined. The reusability determining unit 120 may determine that the code is reusable on the condition that all access made to the global memory during run time of the generated determination code is access for reading out type information.

Here, the determination code is preferably generated on the condition that it is determined that, by profiling statistics of pairs of the object and the type information specified in the function call of the subclass test function, a set of the pairs is not so large and an effect of caching is expected. Determination code having fixed values is generated for each pair. On the condition that it is confirmed, for all the generated determination code, that all access made to the global memory during run time is access for reading out type information, the code of the subclass test function is preferably determined to be reusable.

Additionally, the reusability determining unit 120 preferably creates, for the code of the subclass test function determined to be reusable, a template for collecting an address of the type information accessed by execution of the code. The template is executed and used by the profiling unit 130 to be described later. For example, the template may be created by inserting the following "instrument" code into the aforementioned determination code. Such "instrument" code may be code for collecting an address of the memory that actually stores the type information to be read by the determination code, and storing the collected address in a predetermined area (for example, a predetermined field—hereinafter, referred to as "TypeInfoReadSet" field—of the template serving as an object). Meanwhile, the predetermined area (for example, "TypeInfoReadSet" field) is set empty at the time of creation of the template.

Upon determining that the code called by the function call of the subclass test function is reusable, the reusability determining unit 120 stores, in the analysis result DB 115, the created template and the event information for the function call created by the event creating unit 110. The reusability determining unit 120 may also indicate that the code is reusable by attaching a mark to the code object determined to be reusable, such as by adding one field to the code object and setting a pointer pointing to the template in the added field.

The profiling unit 130 stores, in the profile DB 125, the execution result of the code of the subclass test function determined to be reusable by the reusability determining unit 120 and the specified information specified in the function call of the code as profile information of the code, in association with the type information actually accessed within the code. Here, the execution result of the code is boolean type information indicating whether or not the test-target object specified in the function call of the subclass test function is an instance of the class specified in the function call or an instance of a subclass of the class. Whether or not the code is determined to be reusable is identified based on the mark attached to the code by the reusability determining unit 120.

In addition, as described above, the profiling unit 130 may collect the type information actually accessed within the code of the subclass test function by executing the template created by the reusability determining unit 120. Specifically, in response to execution of the code of the subclass test function determined to be reusable, the profiling unit 130 may read out the corresponding event information and template from the analysis result DB 115 by using the function pointer pointing to the code as a key. The profiling unit 130 then may execute the read out template and obtain an address of the actually accessed type information from the "TypeInfoReadSet" field. The read out corresponding event information and the obtained address of the type information are stored in the profile DB 125 for processes performed by the monitoring unit 145 and the reuse processing unit 140 to be described later.

Also, the profiling unit 130 preferably stores a namespace used during run time of the code as the profile information in the profile DB 125 together with the execution result of the code of the subclass test function. This is done in order to make it possible to confirm that the code called by the function call of the subclass test function does not differ between the time of profiling and the time of reuse of the execution result. It is done by using the namespace when the execution result is reused since bytecode for a subclass test function is absent and an entity of a called function may dynamically change in dynamic programming languages subjected to the present invention.

It is considered that, in Python, a namespace is a dictionary that returns a corresponding object when a name of the object is specified as a key. The namespace is uniquely decided for the entire object including the function call (the uniquely decided dictionary is referred to as a current dictionary). On the other hand, when the algorithm of the called function is changed or a new object having the same name is defined, the current dictionary is replaced by another dictionary or the content of the dictionary changes. Accordingly, it is possible to confirm that the code called by the function call of the subclass test function is the same by confirming that the namespace at the time of profiling matches the namespace at the time of reuse of the execution result.

Meanwhile, the subclass test function is rarely replaced in the built-in dictionary of the system. Accordingly, it may be roughly guaranteed that the called code does not differ between the time of profiling and the time of reuse of the execution result. This is done by limiting the code of the subclass test function whose execution result is to be stored for the purpose of reuse to code of the default subclass test function built in the system. In this case, a pointer of default code is previously obtained. At the time of reuse, it is determined that a pointer of code supposed to be called when the execution result is not reused matches the previously obtained pointer. Obviously, the protection mechanism using the namespace is not limitedly applied to Python but is applicable to other dynamic programming languages that adopt rules similar to those of Python regarding the namespace.

Figure 3:
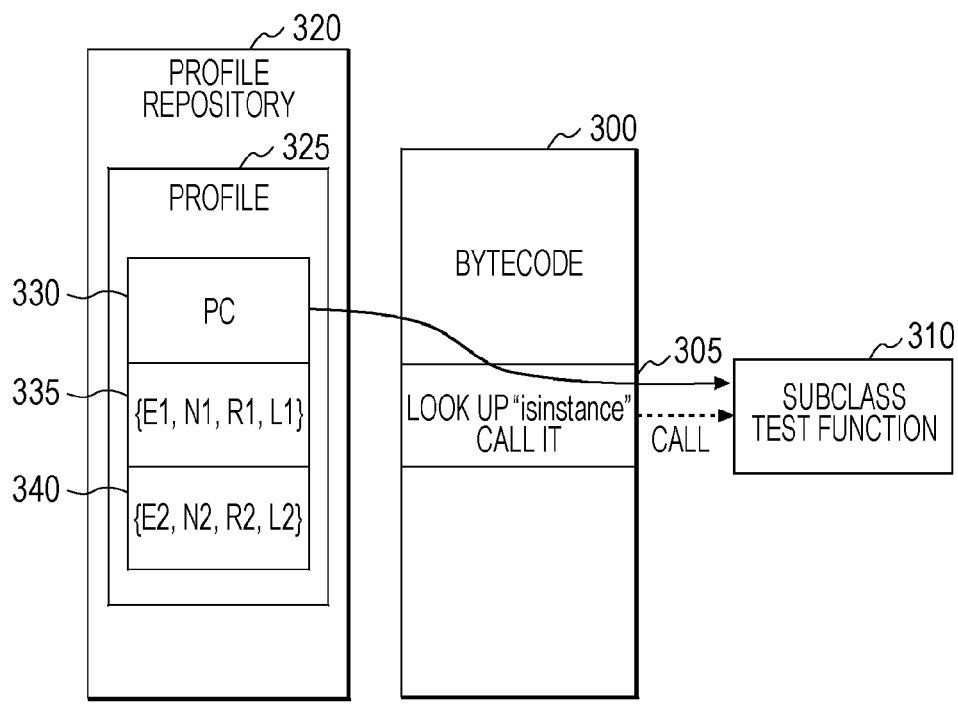
FIG. 3 is a diagram illustrating an example of a data structure of profile information.

FIG. 3 illustrates an example of the profile information stored in the storage device 105 by the profiling unit 130. In FIG. 3, bytecode 300 includes a function call 305. The function call 305 calls code of a subclass test function 310. A profile repository 320 indicates an area in the storage device 105 that stores the profile information and corresponds to the profile DB 125 illustrated in FIG. 1. A profile 325 is a set of pieces of profile information for the subclass test function 310, and includes a pointer PC 330 pointing to the subclass test function 310 and pieces of profile information 335 and 340 obtained when the code is called with different input parameters. Each profile information includes corresponding event information E, a namespace N, a set R of addresses of type information actually accessed during run time, and an execution result L.

In response to detection of a function call of the subclass test function calling code determined to be reusable, the reuse processing unit 140 reads out the corresponding profile information from the profile DB 125. On the condition that specified information specified in the detected function call matches the specified information of the profile information, the reuse processing unit 140 reuses the execution result of the profile information. The detection of the function call of the code determined to be reusable may be performed by confirming that the corresponding profile information exists in the profile DB 125 by using the function pointer as a key. Preferably, the reuse processing unit 140 guarantees that the detected function call calls the code determined to be reusable by confirming that the namespace at the time of generation of the profile information matches the namespace at the time of reuse.

In this embodiment based on the first implementation method in which JIT code reuses the profiled result, the execution result is used in compiled code. Specifically, the reuse processing unit 140 generates reuse code that reuses the execution result included in the profile information, on condition that the specified information specified in the current function call matches the specified information included in the profile information. The generated reuse code is stored in the reuse code DB 135 in order to be executed by the optimization apparatus 100.

An example of the reuse code generated by the reuse processing unit 140 is illustrated below. In this example, the execution result is used on condition that corresponding pieces of specified information specified in the function calls, i.e., objects and pieces of type information match and on the condition that corresponding namespaces match. Meanwhile, "cacheForThisCode→count" indicates the number of entries of the profile information of the code called by the detected function call.

```
for(i=0; i < cacheForThisCode->count; i++) {
if(match(cacheForThisCode->entry[i].nameSpace,currentNameSpace)&&
cacheForThisCode->entry[i].obj == obj &&
cacheForThisCode->entry[i].objType == objType){
result=cacheForThisCode->entry[i].result;
break;
}
}
```

If the above-illustrated reuse code includes no matching entry of the profile information, an instruction for calling the subclass test function may be added. Also, efficiency may be increased by stopping using the loop and the reference to elements of the array in the code. Additionally, when an argument is determined to be a constant in the code (for example, a class argument is a constant), a compiler may appropriately propagate such information in the code to make the reuse code more efficient. It is also possible to speed up the matching check by performing a comparison of identifiers of the namespaces and an invariance check using a technique for assuming that content of the namespaces is invariant.

The monitoring unit 145 monitors the type information associated with the execution result included in the profile information stored in the profile DB 125. In response to a change made to the type information, the monitoring unit 145 prohibits reuse of the execution result associated with the type information. Here, prohibition of reuse of the execution result includes at least one of deletion of the profile information associated with the changed type information or a set of pieces of profile information of each code including the profile information, and deletion of reuse code that reuses the execution result associated with the changed type information.

There may be some concrete implementation methods of the monitoring unit 145. Here, the description will be sequentially given for a first implementation method for inserting code functioning as the monitoring unit 145 into code for changing monitoring-target type information and a second implementation method for using a listener corresponding to a change event for the change of the monitoring-target type information.

In the first implementation method, the reuse processing unit 140 accesses manipulation code for changing type information, in response to reuse of the execution result. On the condition that the type information associated with the reused execution result is changed, the reuse processing unit 140 inserts, into the manipulation code, an instruction sequence for invalidating the reuse code that reuses the execution result. The monitoring unit 145 is realized by execution of the above instruction sequence in response to execution of the manipulation code. Here, the manipulation code for changing type information may be implementation code of an interpreter or may be JIT code compiled by a JIT compiler. Meanwhile, since manipulation code for changing type information is limited and known in a Python interpreter, a list of such manipulation code is previously created and the list is referred to when the invalidation instruction sequence is inserted.

An example of a type-information changing portion of the manipulation code and the instruction sequence to be inserted into the manipulation code is illustrated below. Meanwhile, suppose that the profile information of the reused execution result includes, as the type information accessed during run time, a pointer pointing to a "parents" field of "A. class object" and a pointer pointing to the reuse code that reuses the execution result. Also, suppose that these two pieces of pointer information are obtained by the "getNextTypeInfoReadSet( )" function. The to-be-inserted instruction sequence is inserted in front of or behind the instruction for changing the monitoring-target type information.

```
A. Class Object
struct class_object{
header_t header;
list_t parents;
...
}
B. Type-information Changing Portion of Manipulation Code
t->parents= p
C. To-be-inserted Instruction Sequence
while(s= getNextTypeInfoReadSet( )){
if(s->ptr == &t->parents){
Invalidate(s->JITcode);
}
}
```

In the second implementation method, the monitoring unit 145 is realized as a listener corresponding to a change event of the type information associated with the execution result stored as the profile information. The listener is generated when the profile information is generated by the profiling unit 130, includes a pointer to the corresponding profile information, and is registered in all class objects indicated by the actually accessed type information included in the corresponding profile information. Upon receiving a notification of the type-information change event from any one of the class objects, the listener invalidates the corresponding profile information using the pointer.

Figure 4A:
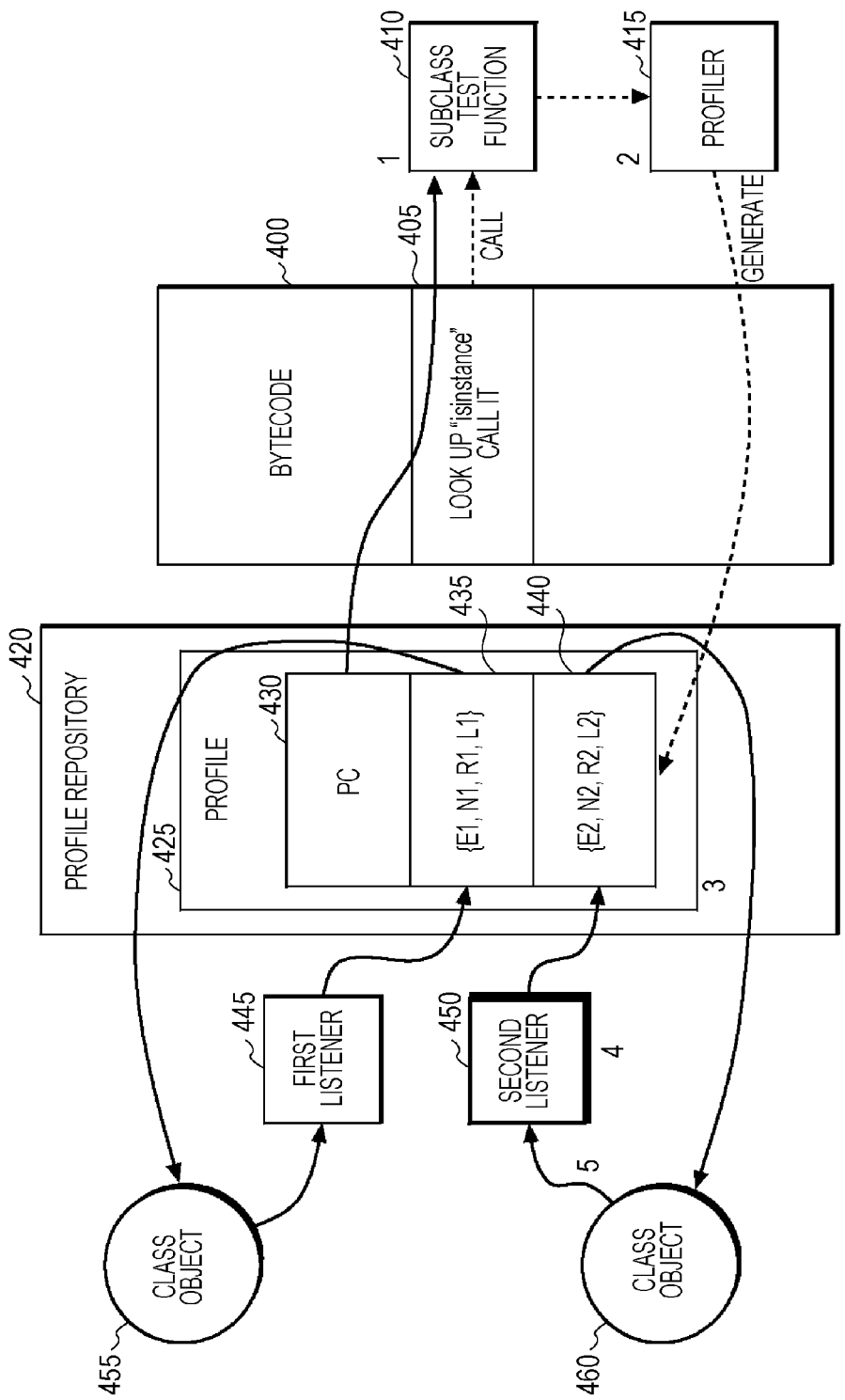
FIG. 4A is a diagram schematically illustrating a flow of a process of generating a listener corresponding to a change event of type information.

FIG. 4A illustrates an overview of a process in which a listener is generated by the profiling unit 130 and the listener is registered in a corresponding class object. Meanwhile, in FIG. 4A, the profiling unit 130 and the profile DB 125 are illustrated as a profiler 415 and a profile repository 420, respectively. In an embodiment, the process occurs as follows:
1. A function call 405 included in bytecode 400 calls a subclass test function 410;
2. The profiler 415 detects the function call of the subclass test function 410;
3. The profiler 415 stores the execution result of the subclass test function 410 in the profile repository 420 as profile information 440;
4. The profiler 415 generates a second listener 450, which is a listener regarding the profile information 440 and has a pointer to the profile information 440; and
5. The profiler 415 registers the second listener 450 in a class object 460 indicated by the actually accessed type information included in the profile information 440. Similarly, a first listener 445 illustrated in FIG. 4A is a listener corresponding to a change event for a class object 455 and has a pointer to profile information 435.

FIG. 4B illustrates an overview of a process in which the generated listener is notified of the change event from the corresponding class object and invalidates the corresponding profile information. Meanwhile, in FIG. 4B, the same components as those illustrated in FIG. 4A are assigned the same numerals. In an embodiment, the process occurs as follows:
1. A change is made to the class object 455;
2. The first listener 445 receives a notification of occurrence of the change event from the class object 455; and
3. The first listener 445 deletes the corresponding profile information 435 from the profile repository 420 using the pointer to the corresponding profile information 435 included therein to invalidate the profile information 435, and deletes itself (the first listener 445). At this time, the first listener 445 may invalidate all of other pieces of profile information 440 for the same code and the second listener 450 associated with the profile information 440.

Additionally, in the second implementation method, the monitoring unit 145 is realized also as a listener corresponding to a change event of type information associated with the reused execution result. The listener is generated when the reuse processing unit 140 reuses the execution result, includes a pointer to reuse code that reuses the corresponding execution result, and is registered in all class objects indicated by the actually accessed type information included in the corresponding profile information. Upon receiving a notification of the type-information change event from any one of the class objects, the listener invalidates the corresponding reuse code using the pointer.

Figure 5A:
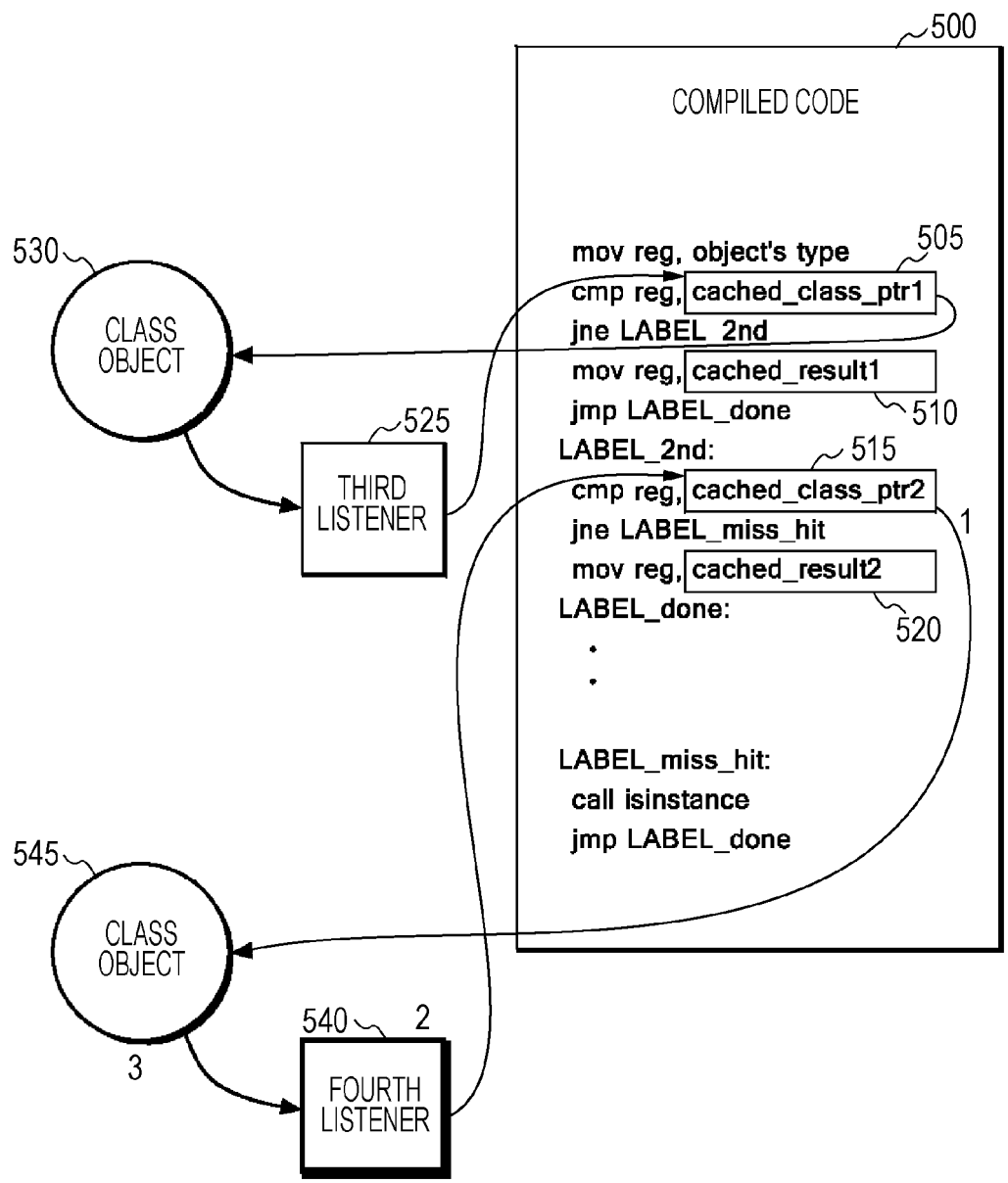
FIG. 5A is a diagram schematically illustrating a flow of another process of generating a listener corresponding to a change event of type information.

FIG. 5A illustrates an overview of a process in which a listener is generated by the reuse processing unit 140 and is registered in a corresponding class object. Meanwhile, compiled code 500 illustrated in FIG. 5A is the function call 405 illustrated in FIG. 4A that has been optimized using a profile 425. Since the profile 425 includes the pieces of profile information 435 and 440 which are execution results of the function call 405 for two pairs of the input parameters, the compiled code 500 is written such that type information specified in the detected (current) function call 405 is compared with each of the two pairs of input parameters and the execution result included in the profile information for the matching type information is used. In an embodiment, the process occurs as follows:
1. The reuse processing unit 140 generates the compiled code 500 using the profile information 440 illustrated in FIG. 4A;
2. The reuse processing unit 140 generates a fourth listener 540 which is a listener regarding the compiled code 500 and has a pointer to the compiled code 500; and
3. The fourth listener 540 is registered in a class object 545 indicated by the actually accessed type information included in the profile information 440. Similarly, a third listener 525 illustrated in FIG. 5A is a listener that is registered in a class object 530 indicated by other actually accessed type information included in the profile information 435 and has a pointer to the compiled code 500.

Figure 5B:
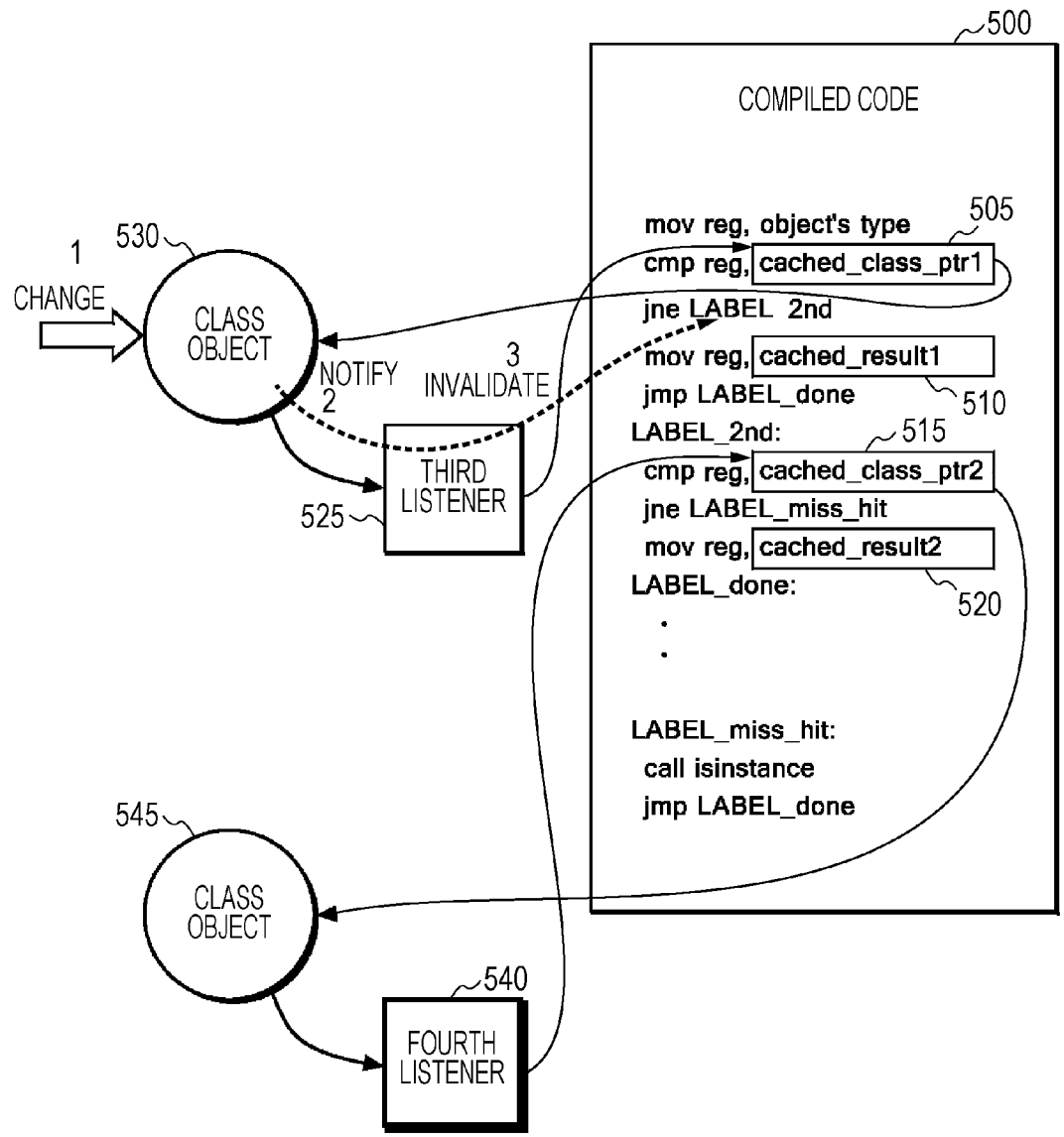
FIG. 5B is a diagram schematically illustrating a flow of a process of invalidating reuse code performed by the listener.

FIG. 5B illustrates an overview of a process in which the generated listener receives a notification of the change event from the corresponding class object and invalidates the corresponding compiled code. Meanwhile, in FIG. 5B, the same components as those illustrated in FIG. 5A are assigned the same numerals. In an embodiment, the process occurs as follows:
1. A change is made to the class object 530;
2. The third listener 525 receives a notification of occurrence of the change event from the class object 530; and
3. The third listener 525 invalidates the entire compiled code 500 using the pointer to the corresponding compiled code 500 included therein. Additionally, the third listener 525 can delete itself (the third listener 525) and the fourth listener 540 associated thereto.

Figure 6:
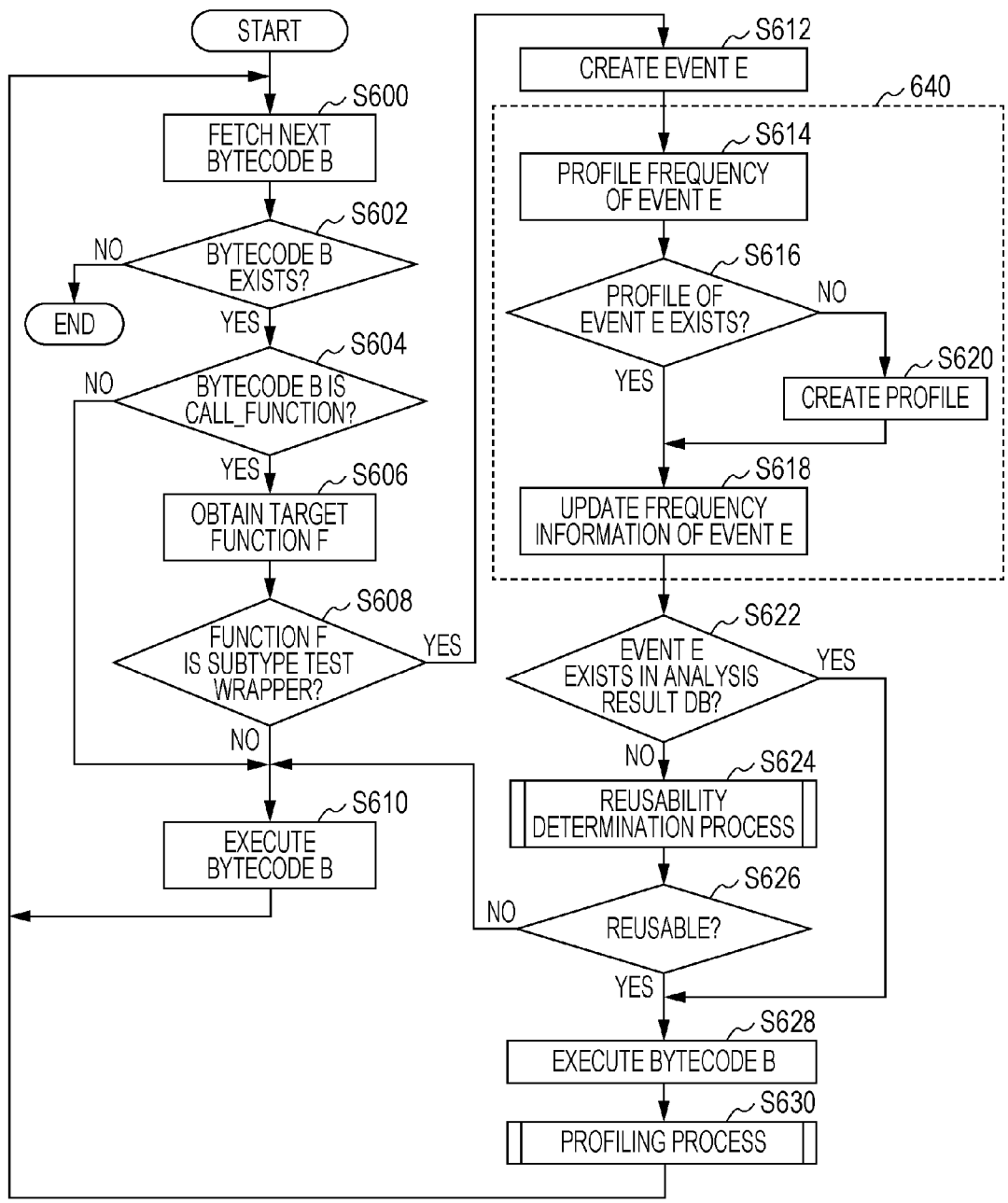
FIG. 6 illustrates an example of an operation flow of a program execution process performed by the optimization apparatus 100 according to the embodiment of the present invention.
Figure 7:
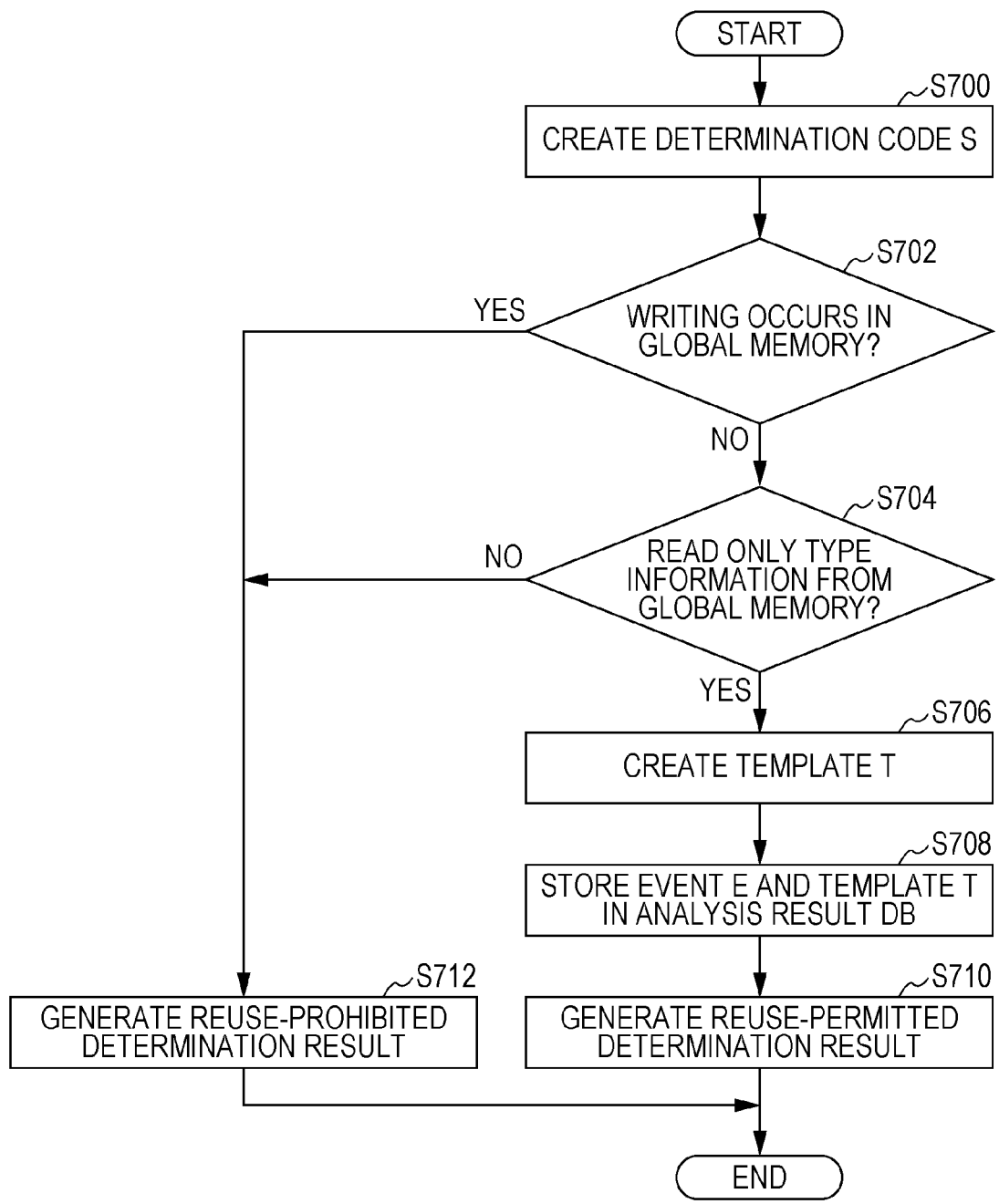
FIG. 7 illustrates an example of an operation flow of a reusability determination process performed by a reusability determining unit 120.
Figure 8:
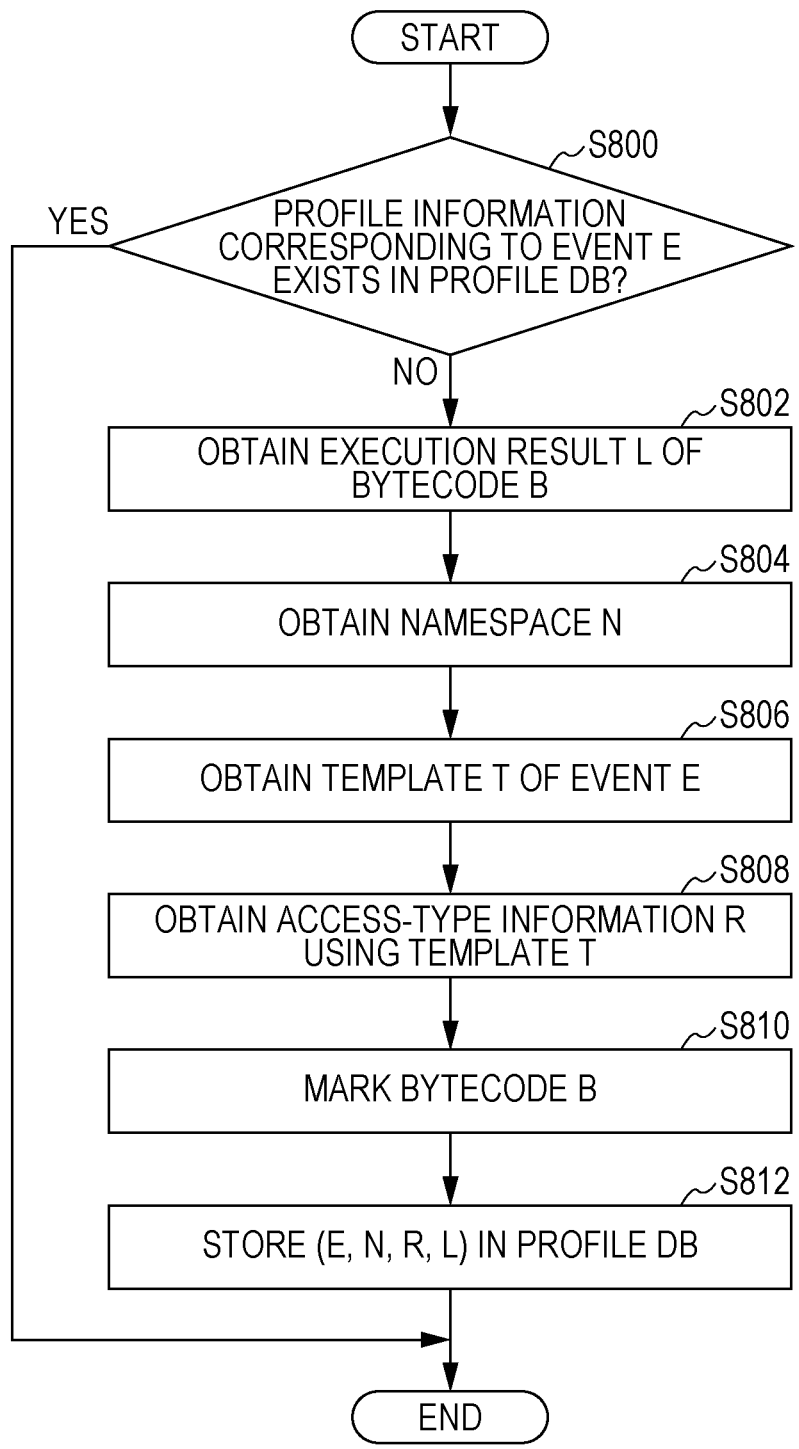
FIG. 8 illustrates an example of an operation flow of a profiling process performed by a profiling unit 130.

Next, operations of the optimization apparatus 100 according to the embodiment of the present invention will be described with reference to FIG. 6 through FIG. 10. FIG. 6 is a flowchart illustrating an example of the flow of a program execution process performed by the optimization apparatus 100. FIG. 7 is a flowchart illustrating an example of the flow of a reusability determination process in step S624 of the flowchart illustrated in FIG. 6. FIG. 8 is a flowchart illustrating an example of the flow of a profiling process in step S630 of the flowchart illustrated in FIG. 6. Meanwhile, in the embodiment of the present invention based on the first implementation method, the program execution process illustrated in FIG. 6 is executed by an interpreter. Additionally, the reusability determination process illustrated in FIG. 7 is executed by a reusability determining module (corresponding to the reusability determining unit 120) called by the interpreter, whereas the profiling process illustrated in FIG. 8 is executed by a profiling module (corresponding to the profiling unit 130) called by the interpreter.

Figure 9:
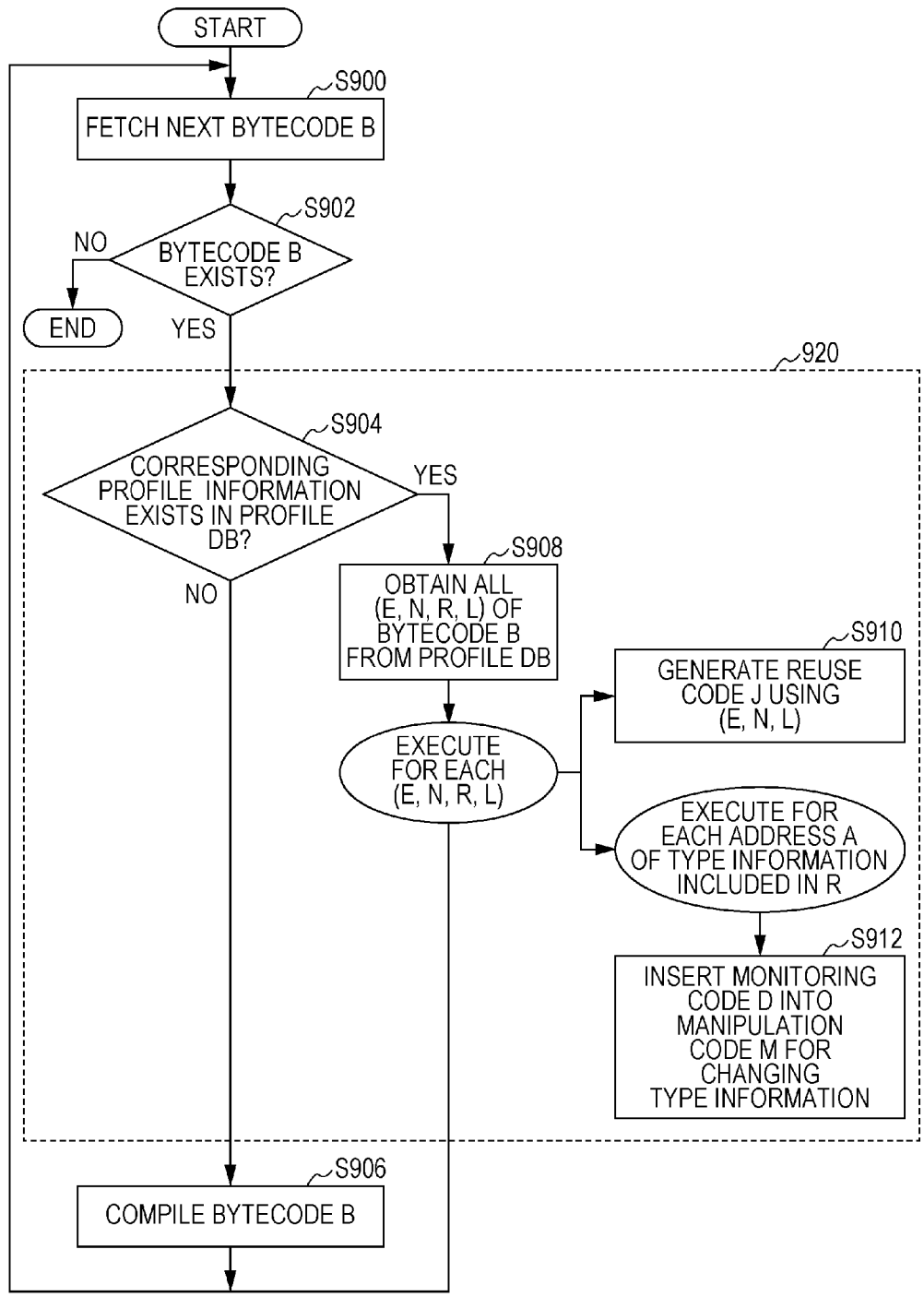
FIG. 9 illustrates an example of an operation flow of a reuse process performed by a reuse processing unit 140.
Figure 10:
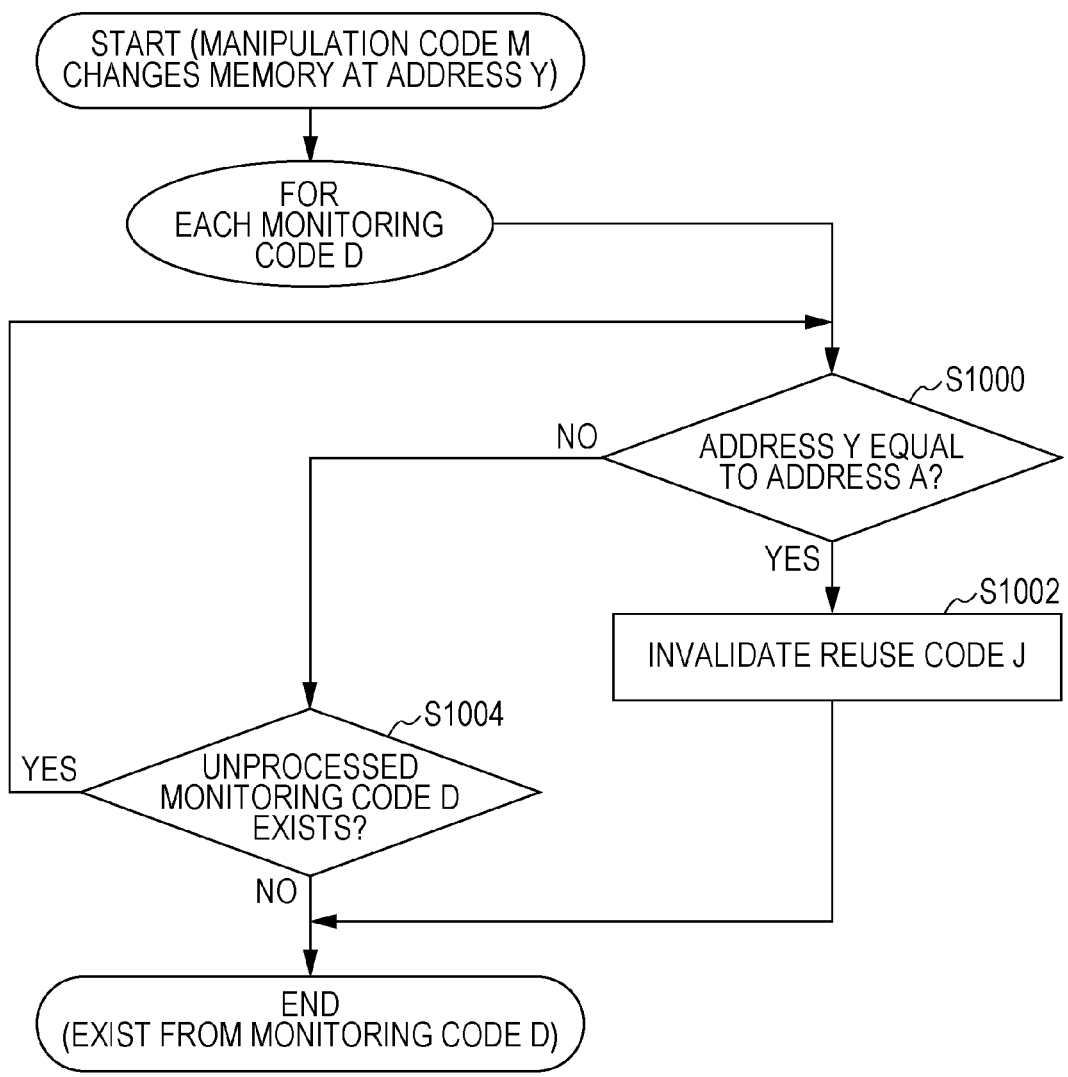
FIG. 10 illustrates an example of an operation flow of a monitoring process performed by a monitoring unit 145.

In addition, FIG. 9 is a flowchart illustrating an example of the flow of a compile process performed by the optimization apparatus 100. FIG. 10 is a flowchart illustrating an example of the flow of a monitoring process performed by the optimization apparatus 100. Meanwhile, in the embodiment of the present invention based on the first implementation method, the compile process illustrated in FIG. 9 is executed by a JIT compiler. Additionally, the monitoring process illustrated in FIG. 10 is executed by the interpreter when type information is changed by the interpreter or is executed by JIT code when type information is changed by the JIT code.

The program execution process illustrated in FIG. 6 starts from step S600 and the optimization apparatus 100 fetches bytecode B to be executed next from an execution-target program. The optimization apparatus 100 then determines whether or not the bytecode B to be executed next exists (step S602). If the bytecode B to be executed next does not exist (NO in step S602), the process ends. On the other hand, if the bytecode B to be executed next exists (YES in step S602), the optimization apparatus 100 determines whether or not the bytecode B is the CALL_FUNCTION instruction (step S604).

If the bytecode B is the CALL_FUNCTION instruction (YES in step S604), the optimization apparatus 100 obtains a target function F to be called by the CALL_FUNCTION instruction (step S606), and determines whether or not the function F is the subtype test wrapper (step S608). If the function F is the subtype test wrapper (YES in step S608), the optimization apparatus 100 creates an event E (step S612). Meanwhile, the event E is information constituted by a function pointer of code C of the subclass test function called by the CALL_FUNCTION instruction via the subtype test wrapper and a pair of arguments specified for the CALL_FUNCTION instruction.

The optimization apparatus 100 then profiles the frequency of the event E (step S614), and determines whether or not profile information regarding the frequency of the event E already exists (step S616). The profile information regarding the frequency of the event E may be stored in the storage device 105 of the optimization apparatus 100. If the profile information of the event E does not exist in the storage device 105 (NO in step S616), the optimization apparatus 100 creates the profile information regarding the frequency of the event E, and stores the profile information in the storage device 105 (step S620). On the other hand, if the profile information of the event E already exists in the storage device 105 (YES in step S616), the optimization apparatus 100 updates the frequency information of the event E stored in the storage device 105 (step 618). A series of processing steps from step S614 to step S620 enclosed by a rectangle 640 may be optional and may be appropriately performed as needed, such as when optimization is desired for the frequently executed code.

Subsequently, the optimization apparatus 100 determines whether or not the event E exists in the analysis result DB 115 (step S622). If the event E does not exist in the analysis result DB 115 (NO in step S622), the optimization apparatus 100 determines reusability of the code C of the subclass test function called by the bytecode B (step S624). Details about the reusability determination process will be described later with reference to FIG. 7. The optimization apparatus 100 then determines whether or not the result of the reusability determination process indicates that the execution result is reusable (step S626). If the determination result indicating that the execution result is not reusable is obtained for the code C of the subclass test function (NO in step S626), if the bytecode B is not the CALL_FUNCTION instruction in step S604, or if the function F is not the subtype test wrapper in step S608, the process proceeds to step S610 and the optimization apparatus 100 executes the bytecode B. The process then returns to step S600 and the optimization apparatus 100 repeats the series of processing steps.

On the other hand, the determination result indicating that the execution result is reusable is obtained for the code C of the subclass test function in step S626 or if the event E exists in the analysis result DB 115 in step S622, the process proceeds to step S628 and the optimization apparatus 100 executes the bytecode B. In parallel to or after execution of this step, the optimization apparatus 100 profiles the execution result of the code C of the subclass test function called by the bytecode B (step S630). Details about the profiling process will be described later with reference to FIG. 8. The process then returns to step S600 and the optimization apparatus 100 repeats the series of processing steps.

The reusability determination process illustrated in FIG. 7 performed by the reusability determining unit 120 starts from step S700 and the reusability determining unit 120 reads out information of the event E, i.e., the function pointer and values of the pair of arguments, from the storage device 105, and creates determination code S by propagating the values of the pair of arguments on the code C of the subclass test function. If the frequency information of the event E is stored in the storage device 105, the reusability determining unit 120 may perform the following processing on the event E having the frequency information equal to or greater than a certain level.

Subsequently, the reusability determining unit 120 executes the determination code S, and determines whether or not write access is made to the global memory during run time (step S702) and whether or not only type information is read out as the global information (step S704). If the access to the global memory is not constituted only by access for reading out the type information (YES in step S702 or NO in step S704), the reusability determining unit 120 generates a determination result for prohibiting the reuse (step S712). The process then ends.

On the other hand, if the access to the global memory is constituted only by access for reading out type information (NO in step S702 and YES in step S704), the reusability determining unit 120 collects addresses of type information accessed during run time of the code C of the subclass test function, and creates the template T that stores the collected information in the "TypeInfoReadSet" field thereof (step S706). The reusability determining unit 120 then stores the created template T and the event E in the analysis result DB 115 (step S708), and generates a determination result for permitting the reuse (step S710). The process then ends.

The profiling process illustrated in FIG. 8 performed by the profiling unit 130 starts from step S800 and the profiling unit 130 determines whether or not profile information corresponding to the event E exists in the profile DB 125. If the profile information corresponding to the event E already exists in the profile DB 125 (YES in step S800), the process ends.

On the other hand, if the profile information corresponding to the event E does not yet exist in the profile DB 125 (NO in step S800), the profiling unit 130 obtains the execution result L of the bytecode B (step S802) and the namespace N (step S804). The profiling unit 130 also obtains the event E and the template T from the analysis result DB 115 using the function pointer used by the bytecode B to make a function call as a key (step S806). The profiling unit 130 then executes the obtained template T, and obtains the set R of addresses of type information accessed during run time from the "TypeInfoReadSet" field of the template T (step S808).

Subsequently, the profiling unit 130 attaches, to the bytecode B, a mark indicating that the execution result is reusable (step S810), and stores the event E, the namespace N, the set R of addresses of type information, and the execution result L in the profile DB 125 as the profile information of the bytecode B (step S812). The process then ends.

The compile process illustrated in FIG. 9 starts from step S900 and the optimization apparatus 100 fetches the bytecode B to be executed next from the execution-target program. The optimization apparatus 100 then determines whether or not unprocessed bytecode B exists (step S902). If the unprocessed bytecode B does not exist (NO in step S902), the process ends. On the other hand, if the unprocessed bytecode B exists (YES in step S902), the optimization apparatus 100 determines whether or not the profile information corresponding to the bytecode B exists in the profile DB 125 (step S904). Such determination is made by confirming that the bytecode B is the CALL_FUNCTION instruction for calling the code C of the subclass test function and that the profile information of the code C of the subclass test function can be retrieved from the profile DB 125 using the function pointer for use in the function call as a key.

If the corresponding profile information does not exist in the profile DB 125 in step S904, the optimization apparatus 100 compiles the bytecode B on the bases of the related art to optimize the bytecode B (step S906). The process then returns to step S900 and the optimization apparatus 100 repeats the series of processing steps. On the other hand, if the corresponding profile information exists in the profile DB 125 in step S904, the optimization apparatus 100 reads out, from the profile DB 125, all pieces of profile information corresponding to the bytecode B, i.e., all sets of pieces of profile information (E, N, R, and L) regarding the code C of the subclass test function called by the bytecode B (step S908).

Subsequently, the optimization apparatus 100 performs, for each of the read out sets of pieces of profile information (E, N, R, and L), generation of reuse code J (step S910) and generation and insertion of monitoring code D (step S912). More specifically, in step S910, the optimization apparatus 100 generates, as compiled code of the bytecode B that calls the subclass test function, the reuse code J that reuses the execution result L included in the profile information, on the condition that values of a pair of arguments specified in the current function call of the subclass test function match values of the pair of arguments included in the event E of the profile information and that the current namespace matches the namespace N of the profile information.

Additionally, step S912 is executed for each address A included in the set R of addresses of type information of the profile information. The optimization apparatus 100 accesses manipulation code M that may change a value of a memory at the address A, and inserts an instruction sequence for invalidating the reuse code J in front of or behind a code changing portion of the manipulation code M on condition that the address of the memory where the change has been made is the address A. After the processing in step S910 and step S912 is performed for all of the sets of pieces of profile information (E, N, R, and L), the process then returns to step S900 and the optimization apparatus 100 repeats the series of processing steps. Meanwhile, in the embodiment of the present invention based on the first implementation method, steps enclosed by a rectangle 920 in FIG. 9 are performed by a reuse processing module (corresponding to the reuse processing unit 140) called by the JIT compiler.

The monitoring process illustrated in FIG. 10 performed by the monitoring unit 145 is started once the code changing portion of the manipulation code M including the one or more pieces of monitoring code D inserted in step S912 of FIG. 9 is executed to change the memory at an address Y. The monitoring unit 145 determines, for each piece of monitoring code D inserted into the manipulation code M, whether or not the address Y matches the address A (step S1000). There are as many pieces of monitoring code D as the number of pieces of type information accessed during run time of the code C of the subclass test function, and the individual pieces of monitoring code D monitor changes made to different pieces of type information. Accordingly, it should be noted that the pieces of monitoring code D are associated with the addresses A of different pieces of type information.

If it is determined that, for any one of the pieces of monitoring code D, the address Y matches the address A in step S1000, the monitoring unit 145 invalidates the corresponding reuse code J by deleting the reuse code J (step S1002). The monitoring unit 145 then terminates the process and the process returns to the original process performed on the manipulation code M. On the other hand, if it is determined in step S1000 that the address Y does not match the address A, the monitoring unit 145 then determines whether or not the unprocessed monitoring code D exists (step S1004). If the unprocessed monitoring code D exists (YES in step S1004), the process returns to step S1000 and the monitoring unit 145 repeats the series of processing steps. On the other hand, if the unprocessed monitoring code D does not exist (NO in step S1004), the monitoring unit 145 terminates the process and the process returns to the original process performed on the manipulation code M.

Figure 11:
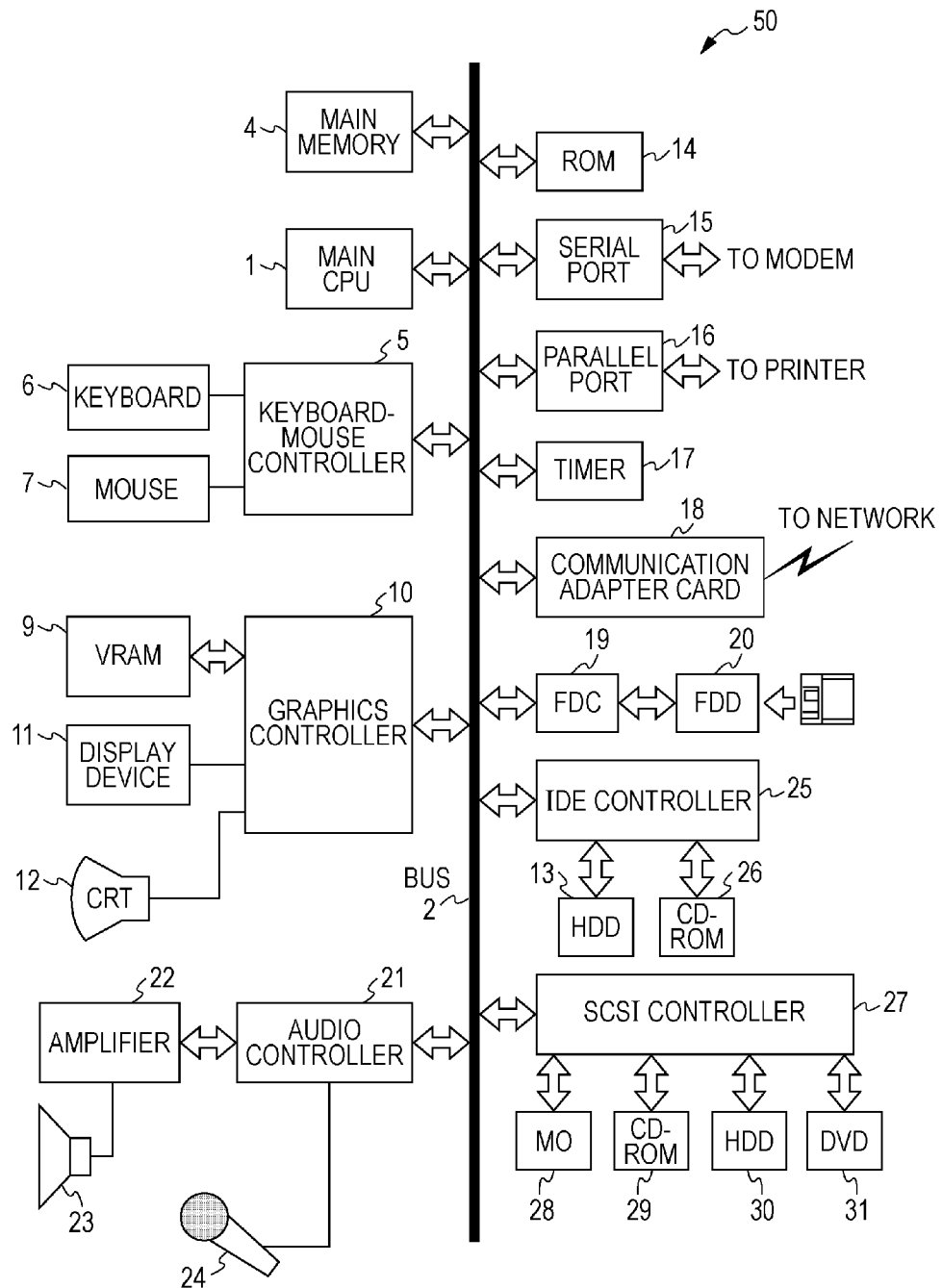
FIG. 11 illustrates an example of a hardware configuration of a computer 50 according to an embodiment of the present invention.

FIG. 11 is a diagram illustrating an example of a hardware configuration of a computer 50 according to an embodiment. The computer 50 includes a main central processing unit (CPU) 1 and a main memory 4 that are connected to a bus 2. Removable storage (external storage system in which recording media are replaceable), such as hard disk drives 13 and 30, CD-ROM drives 26 and 29, a flexible disk drive 20, an MO drive 28, and a DVD drive 31, is connected to the bus 2 via a flexible disk controller 19, an IDE controller 25, a SCSI controller 27, and so forth.

A storage medium, such as a flexible disk, an MO, a CD-ROM, or a DVD-ROM, is inserted into the removable storage. On such a storage medium, the hard disk drives 13 and 30, and a ROM 14, code of a computer program, which operates in cooperation with the operating system to give instructions to the CPU or the like and carries out the present invention, can be recorded. Specifically, on the various storage devices described above, a program for providing an execution environment for executing an execution-target program, which is generated from a source program written in a dynamic programming language and is bytecode to be executed by a virtual machine, can be recorded. More specifically, on the various storage devices described above, interpreters such as CPython, various libraries, such as SSL and zlib, used by interpreters, JIT compilers, and JIT code generated by the JIT compilers can be recorded.

In addition, an optimization program that is installed into the computer 50 and causes the computer 50 to function as the optimization apparatus 100 can be recorded on the various storage devices described above. The optimization program includes an event creating module, a reusability determining module, a profiling module, a reuse processing module, and a monitoring module. These modules control the CPU 1 or the like to cause the computer 50 to function as the event creating unit 110, the reusability determining unit 120, the profiling unit 130, the reuse processing unit 140, and the monitoring unit 145. The computer program may be compressed or divided into a plurality of portions, and may be recorded on a plurality of media.

The computer 50 receives input from input devices, such as a keyboard 6 and a mouse 7, via a keyboard-mouse controller 5. The computer 50 receives input from a microphone 24 and outputs sound from a speaker 23 via an audio controller 21. The computer 50 is connected to a display device 11 via a graphics controller 10 in order to present visual data to a user. The computer 50 is connected to a network via a network adaptor card 18 (such as an Ethernet card or a token-ring card) and can perform communication with other computers or the like.

It should be easily understood from the above description that the computer 50 according to the embodiment is realized by an information processing apparatus such as an ordinary personal computer, a workstation, or a mainframe, or a combination thereof. Meanwhile, the above-described components are merely illustrative and all of the components are not necessarily mandatory to the present invention.

While the present invention has been described above using the embodiments, the technical scope of the present invention is not limited to the scope described in the foregoing embodiments. It is obvious to those skilled in the art that various changes and improvements can be made to the foregoing embodiments. For example, the foregoing embodiments of the present invention have been described based on the first implementation method in which an interpreter performs profiling during run time of a program and JIT code compiled by a JIT compiler uses the profiled result. However, the present invention can be implemented based on the second implementation method in which an interpreter caches and uses the profiled result during run time of a program and the third implementation method in which JIT code having a low optimization level profiles test results and JIT code having a high optimization level uses the profiled results.

The present invention can be embodied in a computer program product reusing an execution result of a subclass test function included in an execution-target program. The computer program product includes a computer readable storage medium having computer readable non-transient program code embodied therein, and configured to perform the steps of the method of the invention.

Figure 12A:
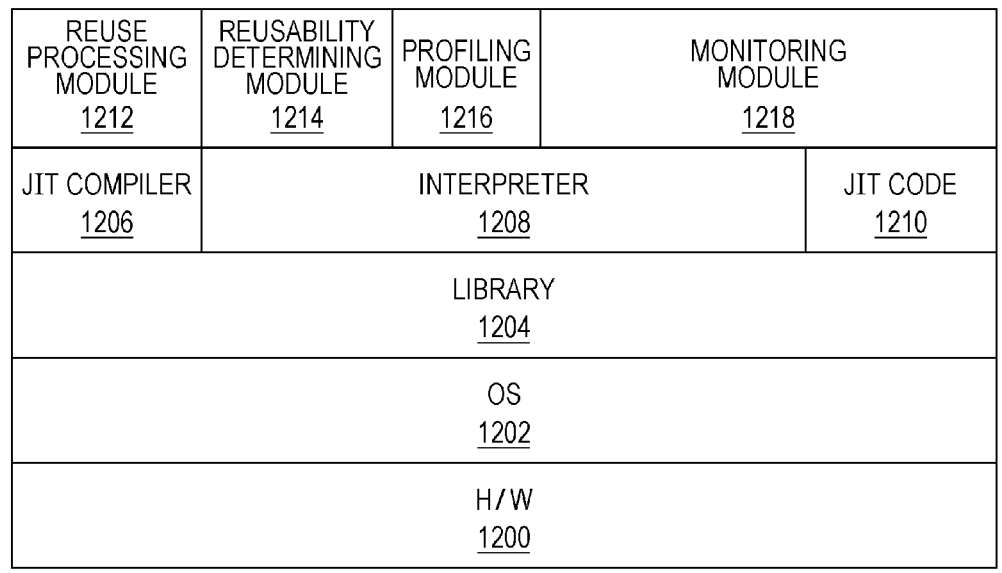
FIG. 12A illustrates an example of a first implementation method of the present invention.

FIG. 12A is a diagram illustrating a relation of modules 1212 to 1218 constituting a reuse program, a JIT compiler 1206, an interpreter 1208, and JIT code 1210 in the first implementation method. Also illustrated are the hardware 1200, the operating system 1202, and the library 1204. In the first implementation method, the reusability determining module 1214 and the profiling module 1216 are called by the interpreter 1208 that is executing an execution-target program. Additionally, the reuse processing module 1212 is called by the JIT compiler when the execution-target program is compiled. Furthermore, the monitoring module 1218 is called by the interpreter 1208 if type information is changed by the interpreter 1208 or is called by the JIT code 1210 if the type information is changed by the JIT code 1210.

Figure 12B:
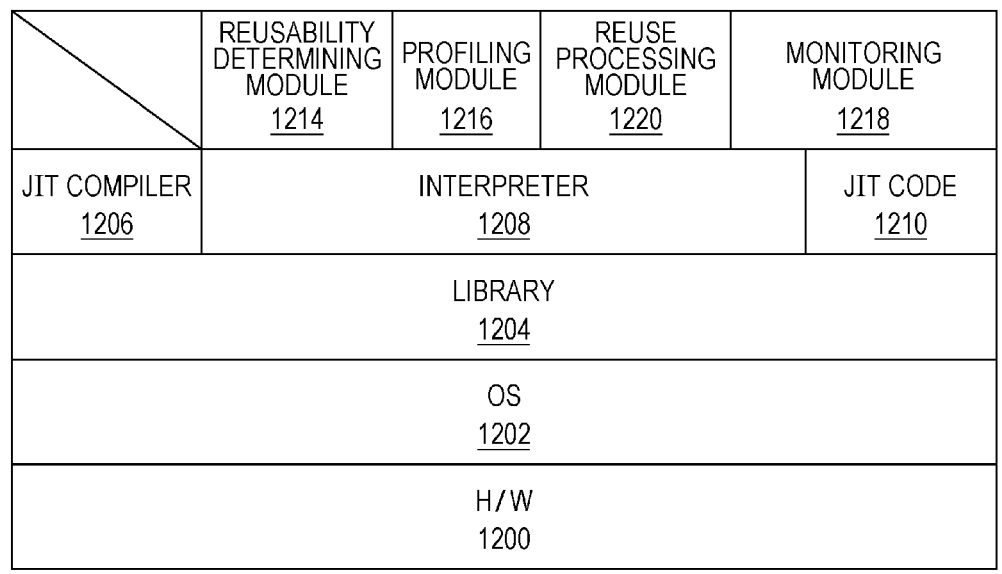
FIG. 12B illustrates an example of a second implementation method of the present invention.

FIG. 12B is a diagram illustrating a relation of modules 1214 to 1220 constituting a reuse program, a JIT compiler 1206, an interpreter 1208, and JIT code 1210 in the second implementation method. Also illustrated are the hardware 1200, the operating system 1202, and the library 1204. The second implementation method differs from the first implementation method in that the reuse processing module 1220 is called by the interpreter 1208 that is executing the execution-target program. Meanwhile, the reuse processing module 1220 in the second implementation method, unlike the reuse processing module 1212 illustrated in FIG. 12A corresponding to the above-described reuse processing unit 140, does not generate reuse code but provides the interpreter 1208 with a function for directly reusing execution results on condition that namespaces matches and values of pairs of arguments match.

Figure 12C:
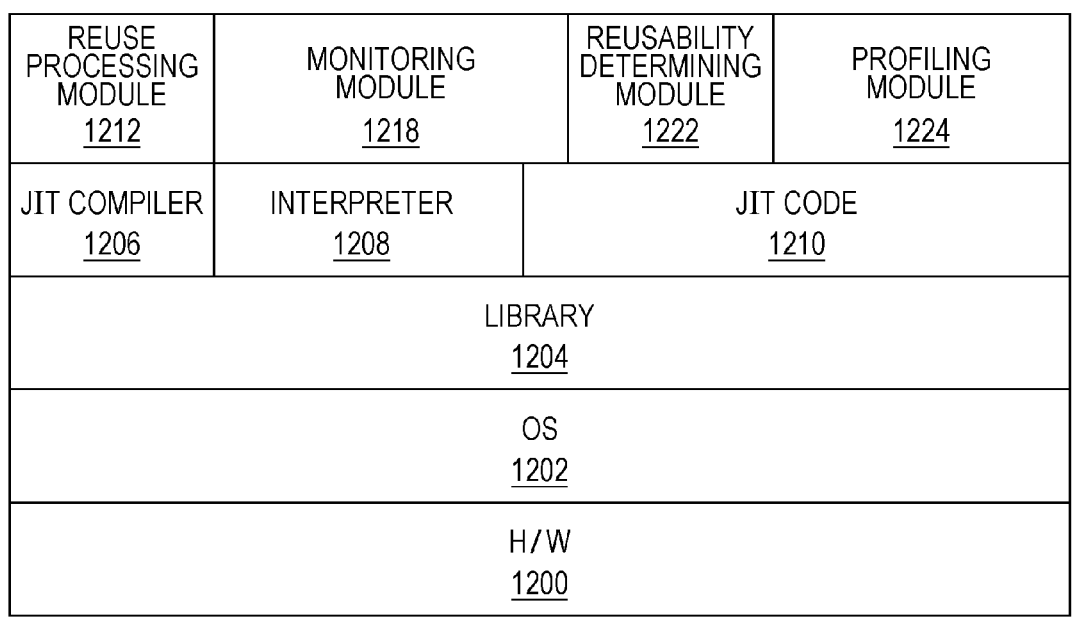
FIG. 12C illustrates an example of a third implementation method of the present invention.

FIG. 12C is a diagram illustrating a relation of modules 1212, 1218, 1222, and 1224 constituting a reuse program, a JIT compiler 1206, an interpreter 1208, and JIT code 1210 in the third implementation method. Also illustrated are the hardware 1200, the operating system 1202, and the library 1204. The third implementation method differs from the first implementation method in that the reusability determining module 1222 and the profiling module 1224 are called by the JIT code 1210. Meanwhile, in the third implementation method, before calling the reuse processing module 1212 and generating JIT code having a high optimization level, the JIT compiler 1206 calls a new module not illustrated in FIG. 12C and generates, as JIT code having a low optimization level, the JIT code 1210 for calling the reusability determining module 1222 and the profiling module 1224. As described above, embodiments obtained by making changes and improvements in the above-described embodiments are obviously included in the technical scope of the present invention.

It should be noted that, regarding the execution order of processes such as operations, procedures, steps, and stages in the apparatuses, the systems, the programs, and the methods described in the claims, the description, and the drawings, expression such as "before" and "prior to" is not explicitly given, and the apparatuses, the systems, the programs, and the methods can be implemented in any order unless the output of a preceding process is used by a following process. It should also be noted that, even when the output of the preceding process is used in the following process, another process may be inserted between the preceding process and the following process or that, even when the description is given such that another process may be inserted between the preceding process and the following process, the configuration can also be changed so that the preceding process is performed immediately before the following process. Even when operation flows in the claims, the description, and the drawings are described using expressions such as "first", "next", and "subsequently" for convenience, this does not necessarily mean that such order is required.

What is claimed is:

1. A method for optimizing a program, comprising:
    determining reusability of code called by a function call of a subclass test function included in an execution-target program, on the basis of whether or not access to a global memory within said code includes only access for reading out type information specified in said function call and information traceable from said type information;

storing an execution result of code determined to be reusable and specified information specified in said function call of said code in a storage device as profile information of said code, in association with type information actually accessed within said code;

reading out, in response to detection of said function call of the subclass test function that calls the code determined to be reusable, the profile information of said code from said storage device, and reusing said execution result of said profile information provided that the specified information of said profile information matches specified information specified in said detected function call; and monitoring said type information associated with said execution result included in said profile information stored in said storage device, and prohibiting, in response to a change made to said type information, reuse of said execution result associated with said type information, wherein said prohibiting said reuse of the execution result includes deleting said profile information associated with said change made to said type information and inserting an instruction sequence that invalidates said reuse of said execution result, wherein a processor coupled to a memory device is configured to perform: the determining, the storing, the reading out and the monitoring.

2. The method according to claim 1, wherein said step of storing further stores a namespace used at run time as said profile information of said code determined to be reusable together with said execution result of said code, and said step of reusing further confirms that said detected function call calls said code determined to be reusable by confirming that said namespace of the read out profile information matches a current namespace.

3. The method according to claim 2, wherein said step of reusing includes a step of generating, as compiled code, reuse code that reuses said execution result of said profile information, provided that the specified information specified in said detected function call matches the specified information of said profile information.

4. The method according to claim 3, further comprising:
accessing pre-registered manipulation code for changing type information, and inserting, into said pre-registered manipulation code, an instruction sequence for invalidating said reuse code that reuses said execution result provided that said type information associated with said reused execution result is changed, wherein said step of prohibiting is performed by execution of said instruction sequence.

5. The method according to claim 1, wherein said code of said subclass test function whose execution result is to be stored for the purpose of reuse is limited to code of a default subclass test function.

6. The method according to claim 5, further comprising:
generating a listener that corresponds to a change event of said type information associated with said execution result stored as said profile information and that invalidates, in response to occurrence of said change event, said profile information corresponding to said changed type information, wherein the step of prohibiting is performed by execution of said listener.

7. The method according to claim 5, further comprising:
generating a listener that corresponds to a change event of said type information associated with said reused execution result and that invalidates, in response to occurrence of said change event, said reuse code that reuses said execution result, wherein said step of prohibiting is performed by execution of said listener.

8. The method according to claim 2, wherein, in said step of determining, all access instructions to said global memory from said code for which reusability is determined are retrieved, and it is statically determined that said code is reusable provided that all of said retrieved access instructions are regarding access for reading out said type information specified in said function call of said subclass test function and said information traceable from said type information.

9. The method according to claim 2, wherein, in said step of determining, computer determination code is generated in which values of an object and said type information that are specified in said function call of said subclass test function are propagated on said code for which reusability is determined, and it is dynamically determined that said code is reusable provided that all access made to said global memory during run time of said generated determination code is access for reading out said type information.

10. The method according to claim 2, further comprising:
creating, for said code determined to be reusable, a template for collecting an address of type information accessed by execution of said code, wherein said profile information is generated using a result of execution of said template.

11. The method according to claim 2, wherein said execution-target program is bytecode generated by a Python interpreter from a source program written in Python.

12. A computer program product reusing an execution result of a subclass test function included in an execution-target program, the computer program product comprising: a non-transitory computer readable storage medium having computer readable non-transient program code embodied therein, the computer readable program code comprising: computer readable program code configured to perform the steps of a method according to claim 1.

13. A computer program product reusing an execution result of a subclass test function included in an execution-target program, the computer program product comprising: a non-transitory computer readable storage medium having computer readable non-transient program code embodied therein, the computer readable program code comprising: computer readable program code configured to perform the steps of a method according to claim 2.

* * * * *